(12) United States Patent
Uwai et al.

(10) Patent No.: US 9,450,229 B2
(45) Date of Patent: Sep. 20, 2016

(54) POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

(71) Applicant: NISSAN MOTOR CO., LTD., Yokohama-shi, Kanagawa (JP)

(72) Inventors: Kenta Uwai, Yokohama (JP); Manabu Kaseda, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/776,165

(22) PCT Filed: Mar. 13, 2014

(86) PCT No.: PCT/JP2014/056793
§ 371 (c)(1),
(2) Date: Sep. 14, 2015

(87) PCT Pub. No.: WO2014/142279
PCT Pub. Date: Sep. 18, 2014

(65) Prior Publication Data
US 2016/0036041 A1  Feb. 4, 2016

(30) Foreign Application Priority Data

Mar. 15, 2013 (JP) ................ 2013-054052

(51) Int. Cl.
*H01M 4/131* (2010.01)
*H01M 4/525* (2010.01)
*H01M 10/052* (2010.01)
*H01M 4/505* (2010.01)
*H01M 10/0525* (2010.01)
*H01M 4/02* (2006.01)

(52) U.S. Cl.
CPC ............ *H01M 4/131* (2013.01); *H01M 4/505* (2013.01); *H01M 4/525* (2013.01); *H01M 10/052* (2013.01); *H01M 10/0525* (2013.01); *H01M 2004/021* (2013.01); *H01M 2004/028* (2013.01); *Y02E 60/122* (2013.01)

(58) Field of Classification Search
None
See application file for complete search history.

(56) References Cited

U.S. PATENT DOCUMENTS

2002/0106565 A1* 8/2002 Hayashi ............ H01M 4/30
429/223
2005/0191553 A1  9/2005 Fujihara et al.
(Continued)

FOREIGN PATENT DOCUMENTS

CN    1661846 A    8/2005
CN  102576866 A    7/2012
(Continued)

*Primary Examiner* — Cynthia K Walls
(74) *Attorney, Agent, or Firm* — Foley & Lardner LLP

(57) ABSTRACT

[Object] Provided is a means capable of suppressing a decrease in capacity and improving output characteristics of a non-aqueous electrolyte secondary battery when the battery is used for a long period of time.
[Solving Means] Disclosed is a positive electrode active substance for a non-aqueous electrolyte secondary battery, in which the true density/tap density of secondary particles of a lithium composite oxide containing nickel as the main component is within the range of 1.6 to 2.3, and in the secondary particles, the average porosity on the center side of the half (R/2 [μm]) of the particle radius (R) of D50 of the secondary particles is larger than the average porosity on the surface side.

13 Claims, 4 Drawing Sheets

(56) References Cited

U.S. PATENT DOCUMENTS

| | | | |
|---|---|---|---|
| 2011/0123866 A1* | 5/2011 | Pan | H01M 2/16 429/221 |
| 2011/0171529 A1 | 7/2011 | Kono et al. | |
| 2012/0183855 A1 | 7/2012 | Wohlfahrt-Mehrens et al. | |
| 2012/0328942 A1* | 12/2012 | Thomas-Alyea | H01M 4/587 429/211 |
| 2013/0209888 A1 | 8/2013 | Nagai | |

FOREIGN PATENT DOCUMENTS

| | | |
|---|---|---|
| JP | 2001-085006 A | 3/2001 |
| JP | 2003-346798 A | 12/2003 |
| JP | 2004-55247 A | 2/2004 |
| JP | 2006-318929 A | 11/2006 |
| JP | 2011-105588 A | 6/2011 |
| WO | WO 2010/116839 A1 | 10/2010 |
| WO | WO 2011/083648 A1 | 7/2011 |
| WO | WO 2012/049779 A1 | 4/2012 |

* cited by examiner

POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

TECHNICAL FIELD

The present invention relates to a positive electrode active substance, a positive electrode material, a positive electrode, and a non-aqueous electrolyte secondary battery.

BACKGROUND ART

Currently, a non-aqueous electrolyte secondary battery including a lithium ion secondary battery, which is used for a mobile device such as a mobile phone, is available as a commercial product. The non-aqueous electrolyte secondary battery generally has a constitution that a positive electrode having a positive electrode active substance or the like coated on a current collector and a negative electrode having a negative electrode active substance or the like coated on a current collector are connected to each other via an electrolyte layer in which a non-aqueous electrolyte solution or a non-aqueous electrolyte gel is maintained within a separator. According to absorption and desorption of ions such as lithium ions on an electrode active substance, charging and discharging reactions of a battery occur.

In recent years, it is desired to reduce the amount of carbon dioxide in order to cope with the global warming. As such, a non-aqueous electrolyte secondary battery having small environmental burden has been used not only for a mobile device or the like but also for a power source device of an electric vehicle such as a hybrid vehicle (HEV), an electric vehicle (EV), and a fuel cell vehicle.

As the non-aqueous electrolyte secondary battery for application to an electric vehicle, it is required to have high output and high capacity. As a positive electrode active substance used for the positive electrode of a non-aqueous electrolyte secondary battery for an electric vehicle, a lithium cobalt composite oxide, which is a layered composite oxide, has been already widely used since it can provide high voltage at the level of 4 V and has high energy density. However, due to resource scarcity, cobalt as a raw material is expensive, and considering the possibility of having dramatic demand in future, it is not stable in terms of supply of a raw material. There is also a possibility of having an increase in the raw material cost of cobalt. Accordingly, a composite oxide having less cobalt content ratio is desired.

Similarly to a lithium cobalt composite oxide, a lithium nickel composite oxide has a layered structure. In addition, it is less expensive than the lithium cobalt composite oxide and is almost equivalent to the lithium cobalt composite oxide in terms of theoretical discharge capacity. From this point of view, it is expected that a lithium nickel composite oxide (for example, $LiNiO_2$ or $Li(Ni_x, Co_y, Mn_z)O_2$ ($x+y+z=1$, $x>y$, $x>z$) or the like) is used for constituting a battery with high capacity for practical use.

According to a lithium ion secondary battery in which a lithium nickel composite oxide is used for a positive electrode active substance, charging and discharging occurs as a result of desorption and insertion of lithium ions to the nickel composite oxide. At that time, the composite oxide undergoes shrinkage and expansion in conjunction with the desorption and insertion of lithium ions. For such reasons, although stable insertion and desorption of lithium ions occurs on a surface of an active substance particle, it is difficult to have insertion and desorption of lithium ions in a center part so that deviation in Li concentration may easily occur within an active substance particle. In addition, a crack occurs in the particle due to a factor such as the collapse of the crystal structure or the like. According to this crack, the conductive path is lost, which causes a decrease in capacity or an increase in resistance of a battery. There is also a problem such as poor durability, that is, a huge decrease in capacity is caused according to repeated charge and discharge cycle and the decrease in capacity becomes significant when the battery is used for a long period of time.

In view of the aforementioned problems, Patent Document 1, for example, is characterized in that having relatively large primary particles for forming secondary particles in a lithium nickel composite oxide is suggested to lower the porosity of the secondary particles. According to the technique described in Patent Document 1, relatively large primary particles are used to lower the porosity of the secondary particles, that is, it is suggested to suppress a decrease in capacity by increasing the density of a positive electrode active substance.

CITATION LIST

Patent Document

Patent Document 1: JP 2001-85006 A

SUMMARY OF INVENTION

Technical Problem

However, according to the technique described in Patent Document 1, the density of a positive electrode active substance is increased by using relatively large primary particles so that over-densification of primary particles occurs within a particle. Accordingly, the Li diffusion property is lowered within a particle, and thus there is a problem of having lowered output characteristics.

Thus, an object of the present invention is to provide, with regard to a non-aqueous electrolyte secondary battery in which a lithium nickel composite oxide is used for a positive electrode active substance, a means capable of improving the output characteristics by suppressing a decrease in the capacity during the use for a long period of time, which is caused by shrinkage and expansion of the composite oxide.

Solutions to Problem

The inventors of the present invention conducted intensive studies. As a result, it was found that, with regard to secondary particles of a lithium composite oxide as a positive electrode active substance for a non-aqueous electrolyte secondary battery, which contain nickel as the main component, the aforementioned problems can be solved when the true density/tap density is within a specific range and the average porosity on the center side of the half (R/2 [μm]) of the particle radius R of the secondary particles is larger than the average porosity on the surface side in the secondary particles.

DESCRIPTION OF EMBODIMENT

Figure 1:
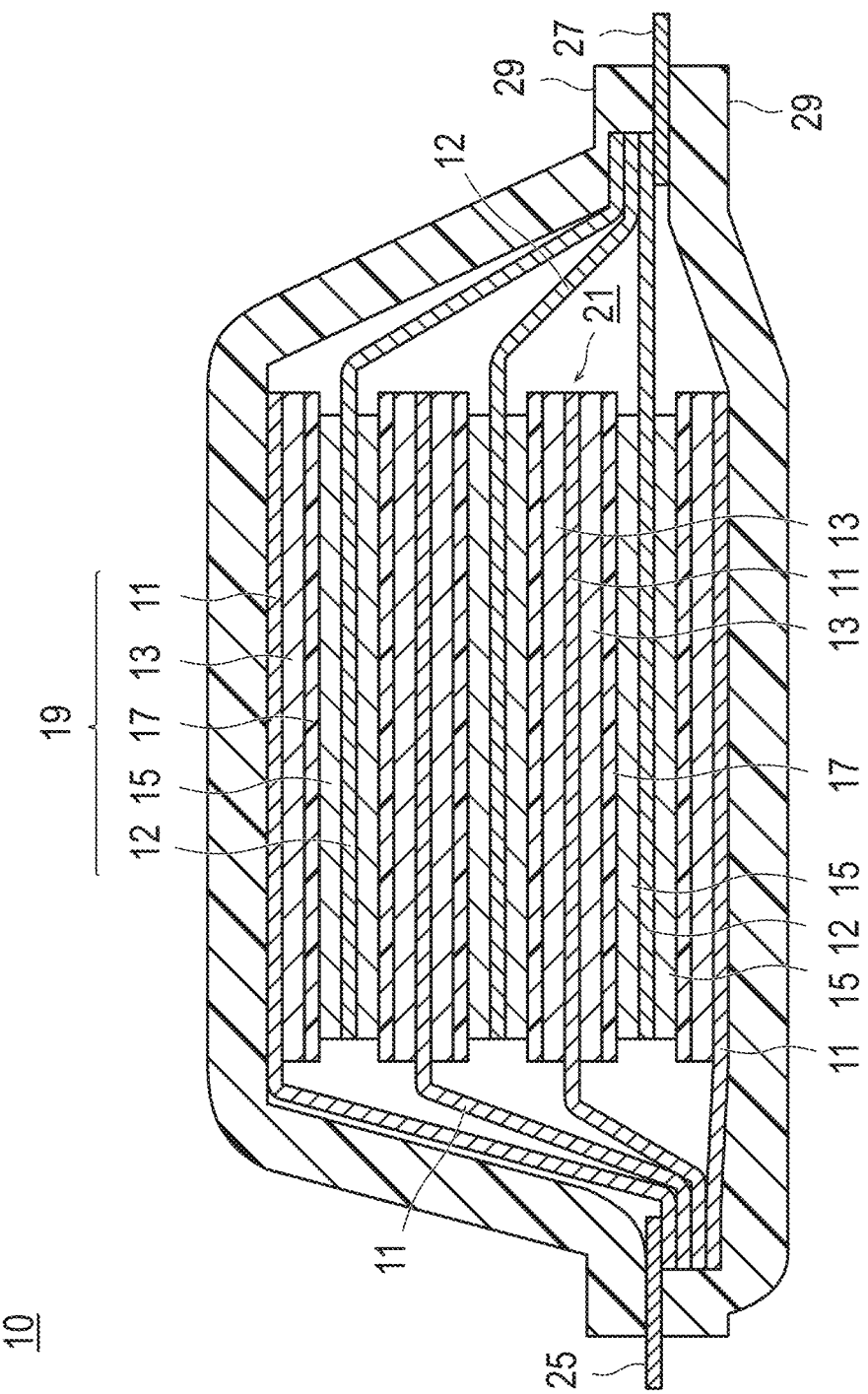
FIG. 1 is a cross-sectional view schematically illustrating a basic constitution of a flat type (stack type) non-aqueous electrolyte lithium ion secondary battery which is not a bipolar type as one embodiment of the non-aqueous electrolyte lithium ion secondary battery.

The first embodiment of the present invention is a positive electrode active substance for a non-aqueous electrolyte secondary battery, characterized in that the true density/tap density of secondary particles of a lithium composite oxide containing nickel as the main component is within the range of 1.6 to 2.3 and the average porosity on the center side is larger than that on the surface side in the secondary particles. As described herein, the expression "the average porosity on the center side is larger than that on the surface side in the secondary particles" means that the average porosity on the center side (inner side) of the half (R/2 [μm]) of the particle radius R of D50 of the secondary particles is larger than the average porosity on the surface side (outer side) in the secondary particles.

According to the positive electrode active substance for a non-aqueous electrolyte secondary battery of the present invention, pores with suitable size are formed at the center part of the secondary particles. Furthermore, as cracks of particles caused by shrinkage and expansion of composite oxide occur from the inside of the secondary particles, the pores in the center part of the secondary particles exhibit an effect of alleviating expansion-shrinkage, and thus cracks of particles can be prevented. As a result, a decrease in capacity during use for a long period of time can be suppressed. In addition, by forming pores with suitable size at the center part of the secondary particles such that primary particles in the secondary particles do not undergo over-densification, the Li diffusion property in the secondary particles can also be enhanced. As a result, the secondary battery using that active substance can have improved output characteristics.

The lithium composite oxide having nickel as the main component (hereinbelow, also referred to as the "lithium nickel-based composite oxide") has a layered crystal structure in which a lithium atom layer and a transition metal atom layer (Ni, and also Mn or Co substituting a part of Ni in crystal lattice are arranged) are alternately stacked via an oxygen atom layer. Furthermore, there is one Li atom included per atom of transition metal (for example, Ni) of the composite oxide and extractable Li amount is twice the amount of spinel type lithium manganese oxide, that is, the supply ability is two times higher, and thus it can have high capacity.

However, in the lithium nickel-based composite oxide, shrinkage and expansion of composite oxide occurs in conjunction with desorption and insertion of lithium ions when charging and discharging is performed according to desorption and insertion of lithium ions. For such reasons, although stable insertion and desorption of lithium ions can occur on a surface of an active substance particle, it is difficult to have insertion and desorption of lithium in a center part so that deviation in Li concentration may easily occur within an active substance particle. In addition, a crack occurs in the particle due to a factor such as the collapse of the crystal structure or the like. According to this crack, the conductive path is lost, which causes a decrease in capacity or an increase in resistance of a battery. There is also a problem such as poor durability, that is, a huge decrease in capacity is caused according to repeated charge and discharge cycle and the decrease in capacity becomes significant when the battery is used for a long period of time (decrease in cycle characteristics, for example, decrease in discharge capacity retention rate).

Such a decrease in cycle characteristics becomes more significant in a battery with layered structure, in particular, a battery installed in an automobile. Since the battery with layered structure, in particular, a battery installed in an automobile, has a large size unlike a battery used for a mobile phone or a mobile PC, there is a concern regarding an occurrence of huge temperature difference between inside and outside of the layered product. In a battery with layered structure, the inside in the stacking direction is most prone to temperature increase and it is believed that the temperature decreases toward the tip part due to heat discharge through an outer case. The positive electrode material having a layered rock salt structure such as a lithium nickel-based composite oxide has temperature dependency of the reaction so that the crystal structure is easily collapsed, and also cracks of particles easily occur in accordance with temperature increase. In this regard, it is believed that, in accordance with easy insertion and desorption of lithium ions according to temperature increase, frequency of the shrinkage and expansion of composite oxide is increased. Namely, as the temperature unevenness may easily occur in the stacking direction, the unevenness in degree of shrinkage and expansion of a positive electrode material also occurs in a stack type battery. When a battery is used for a long period of time, crack of particles (peeling of particles) may easily occur in an area with high temperature load due to shrinkage and expansion of the material of a positive electrode active substance. Accordingly, it is believed that a decrease in battery capacity is caused. In a lamination type battery, in particular a battery with large size (with large capacity and area), it becomes more difficult to have electric potential as the distance from an electrode tab increases when lithium ion conduction occurs from a current collecting plate (electrode tab) side to an outer side of an electrode in a rectangular electrode. Furthermore, since a deviation in electric potential distribution increases in an electrode, it is believed that the unevenness is promoted and capacity deterioration and resistance increase is promoted. Furthermore, although it can be considered to suppress capacity decrease by increasing the density of a positive electrode active substance with use of relatively large primary particles, over-densification of the primary particles occurs within the particle to lower the Li diffusion property within the particle. Thus, there is a problem of having lowered output characteristics. When charge and discharge is performed at a high rate, in particular, the Li diffusion property within the particle is poor so that the diffusion speed of lithium ions within the particle cannot follow the charge and discharge reaction. As a result, there is a problem that output characteristics are not obtained at sufficient level.

Furthermore, when such composite oxide is applied to a non-aqueous electrolyte secondary battery, in particular, a battery installed in an automobile, long service life that is significantly distinguished from that used for electric and mobile electronic devices of a related art is required. For use in electric and mobile electronic devices of a related art, for example, only 500 cycles or so may be sufficient. However, for a battery installed in an automobile, it is necessary to maintain capacity at certain level or above even at cycle number of 1000 to 1500 cycles. Until now, there have been no enough studies made for a lithium nickel-based composite oxide which can endure such long-term cycle.

In addition, when a non-aqueous electrolyte secondary battery is used as a power source of an automobile or the like, it is required to have a high capacity to have high output for enabling smooth start and acceleration and to increase further the cruising distance.

While keeping in mind the battery for an automobile which is involved with such strict requirements, the inventors of the present invention conducted studies on a lithium nickel-based composite oxide that can be used for a secondary battery with high output and high capacity while the capacity decrease is suppressed (cycle characteristics are improved) during use for a long period of time.

As a result, it was found that the ratio of the true density/tap density of the lithium nickel-based composite oxide (secondary particle) as a positive electrode active substance and porosity in the secondary particles play an important role in the performance of the particles. It was also found that the lithium nickel-based composite oxide which has a true density/tap density within a specific range and the porosity on an inner side of the secondary particles larger than the porosity on the surface side exhibits good balance between the output characteristics and capacity characteristics (cycle characteristics)

Although the accurate working mechanism remains unclear, it is believed as follows: as the true density/tap density of the lithium nickel-based composite oxide (secondary particles), which is the positive electrode active substance of the present invention, is 2.3 or less, suitable pores are present in a center part of the secondary particles within the positive electrode active substance, and thus the collapse of the crystal structure caused by expansion and shrinking resulting from charge and discharge cycle can be suppressed. It is thus believed that the capacity decrease occurring during long term use of a secondary battery, in which the active substance is used, is small so that the resistance increase is suppressed. Furthermore, as the true density/tap density is 1.6 or more, pores with suitable size are formed in a center part of the secondary particles without having over-densification of primary particles. Since the pores in a center part of the secondary particles exhibit an effect of alleviating expansion-shrinkage, cracks of particles can be prevented. Thus, it is believed that the secondary battery using this active substance can have improved output characteristics. Furthermore, as for the true density and tap density, those measured by the method described in Examples are used.

In the positive electrode active substance of the present invention, the secondary particles are formed by aggregation of the primary particles and pores are present between each primary particle in the secondary particles. The present invention is characterized in that the porosity in the secondary particles is larger on a center side than a surface side. Specifically, it is characterized in that the average porosity on the center side (inner side) of the half (R/2 [μm]) of the particle radius R of D50 of the secondary particles is larger than the average porosity on the surface side (outer side) in the secondary particles. As the average porosity on the inner side of the secondary particles is larger than the average porosity on the surface side of the secondary particles, pores with suitable size are formed in the center part of the secondary particles without having over-densification of the primary particles. As such, the Li diffusion property can be enhanced in the secondary particles, in particular, in the center part. As a result, the secondary battery using this active substance can have suppressed capacity decrease caused by use for a long period of time. From this point of view, it is preferable that the average porosity on the center side (inner side) of the half (R/2 [μm]) of the particle radius R of D50 of the secondary particles is 0.7 to 20%, preferably 5 to 20%, and more preferably 5 to 15%, in the secondary particles. Furthermore, it is preferable that the average porosity on the surface (outer side) of the half (R/2 [μm]) of the particle radius R of D50 of the secondary particles is 10% or less, and preferably 0 to 5%, in the secondary particles. As described herein, the average porosity on the center side (inner side) indicates the area ratio of the pore part relative to the total area of the primary particle part and pore part on a cross-section on the center side (inner side) of the secondary particles. Similarly, the average porosity on the surface side (outer side) indicates the area ratio of the pore part relative to the total area of the primary particle part and pore part on a cross-section on the surface side (outer side) of the secondary particles. In addition, it is needless to say that the effect can be exhibited if the average porosity satisfies the aforementioned relationship in the secondary particles while R/2 is employed as a boundary. For example, when the aforementioned relationship is satisfied, a region with smaller porosity than that of the surface side may be present on the center side compared to R/2. Alternatively, a region with larger porosity than that of the center side can be present on the surface side compared to R/2. Furthermore, it is also possible that the porosity varies gradually (slightly increases) from the surface side (outer side) to the center side (inner side) of the secondary particles. Accordingly, with regard to the pores in the secondary particles, they can have a two layer structure (shell-core) in which the porosity is clearly different between the surface side and center side having the half (R/2 [μm]) of the particle radius R of D50 of the secondary particles as a boundary, or they may not have such structure. In general, pores in the secondary particles allow a deviation at certain degree (unevenness) depending on shape or aggregation level of the primary particles. In other words, as long as the aforementioned relationship is satisfied, it is acceptable not to have a constitution in which all areas in the inner part of the center side (core part) have the same porosity, and the porosity may have a suitable distribution for each area in the inner part of the center side (core part). The same may apply for the porosity in the inner part of the surface side (outer side).

Additionally speaking, the porosity of each secondary particle may not have the same (homogeneous) value and it can have a distribution. Namely, as described by the measurement method in Examples, when fifty or more secondary particles are extracted and the porosity is measured on the center side and also the surface side of the half (R/2 [μm]) of the particle radius (R) of D50 of each secondary particle, it is sufficient that the average value obtained from each porosity on the surface side and center side of the fifty or more samples satisfies the aforementioned relationship. In other words, it is sufficient that the average porosity on the center side of the half (R/2 [μm]) of the particle radius (R) of D50 of the secondary particles is larger than the average porosity on the surface side in the secondary particles. Thus, it can be said that, for part of the samples among the fifty or more samples, those in which the average porosity on the center side of the half (R/2 [μm]) of the particle radius (R) of D50 of the secondary particles is smaller than the average porosity on the surface side may be included in the secondary particles.

Furthermore, according to the positive electrode active substance of the present invention, the collapse of the crystal structure caused by expansion and shrinkage resulting from a charge and discharge cycle can be inhibited by having the true density/tap density and the pores in the secondary particles set as those described above, and thus it is believed that peeling of particles caused by expansion and shrinkage in an area with high temperature load can be suppressed. As such, even for a battery which needs to be used for a long period of time such as a layered-structure type battery for an automobile, a decrease in capacity caused by use for a long period of time is inhibited.

The average particle diameter of primary particles (D1) of the positive electrode active substance is preferably 420 nm or less, more preferably in the range of 80 to 420 nm, and even more preferably in the range of 80 to 250 nm. As the average particle diameter of primary particles (D1) is reduced to 420 nm or less, the expansion and shrinkage amount is suppressed, and thus it is excellent from the viewpoint of preventing cracks of particles. Meanwhile, the lower limit of the average particle diameter of primary particles (D1) is not particularly limited, and it is better to have smaller particle diameter. From the viewpoint of the productivity, it is sufficient that the lower limit is 80 nm or more. However, it is needless to say that those with less than 80 nm can also be used. Furthermore, the average particle diameter of secondary particles (D2) of the positive electrode active substance is preferably 5 to 15 μm and more preferably 6 to 11 μm, and even more preferably 7 to 10 μm from the viewpoint of having high output, although it is not particularly limited thereto. When it is 5 μm or more, it is excellent from the viewpoint of having actual production without compromising the productivity. When it is 15 μm or less, it is excellent from the viewpoint of using a battery without compromising the output characteristics or the like. Meanwhile, the "particle diameter" described herein means the maximum distance L among the distances between any two points on a contour line of a particle (specifically, particle on a cross-section which is observed by using an observation means such as a scanning type electron microscope (SEM) and a transmission type electron microscope (TEM)). Furthermore, as for the value of "average particle diameter", it is obtained as follows: an observation means such as a scanning type electron microscope (SEM) and a transmission type electron microscope (TEM) is used and the average particle diameter is calculated for several to several tens of the particles that are observed within an observation range.

The lithium nickel-based composite oxide of the present invention is not particularly limited, and $LiNiO_2$, $Li(Ni_x, Co_y, Mn_z)O_2$ (x+y+z=1, x>y, x>z) or the like can be used. It is preferably lithium-nickel-manganese-cobalt composite oxide (hereinbelow, also simply referred to as the "NMC composite oxide"). The NMC composite oxide has a layered crystal structure in which a lithium atom layer and a transition metal atom layer (Mn, Ni, and Co are arranged with regularity) are alternately stacked via an oxygen atom layer, one Li atom is included per atom of transition metal M, and extractable Li amount is twice the amount of spinel type lithium manganese oxide, that is, as the supply ability is two times higher, it can have high capacity. In addition, as having higher heat stability compared to $LiNiO_2$, it is particularly advantageous among the nickel-based composite oxides that are used as a positive electrode active substance.

The NMC composite oxide includes composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the lithium-nickel-manganese-cobalt composite oxide is preferably represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and b+c+d=1. M represents at least one element selected from a group consisting of Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element be replaced by other metal element, and it is preferable that $0 < x \leq 0.3$ in General Formula (1), in particular. By dissolving at least one selected from a group consisting of Ti, Zr, Nb, W, P, Al, Mg, V, Ca, Sr and Cr, the lattice structure is stabilized so that a decrease in capacity of a battery is prevented even after repeated charge and discharge. Accordingly, it is believed that excellent cycle characteristics can be achieved.

With regard to the NMC composite oxide, the inventors of the present invention found that the influence of deformation or cracking of a composite oxide during charge and discharge described above becomes higher if the metal composition of nickel, manganese and cobalt is heterogeneous such as $LiNi_{0.5}Mn_{0.3}Co_{0.2}O_2$. It is believed that, as the metal composition is heterogeneous, a variation is caused in stress applied to inside of particle during expansion and shrinking so that cracks are more easily generated in the composite oxide. Thus, when comparison is made with a composite oxide having a rich Ni abundance ratio (for example, LiNi$_{0.8}$Mn$_{0.1}$Co$_{0.1}$O$_2$) or composite oxide with homogenous abundance ratio of Ni, Mn and Co (for example, LiNi$_{0.3}$Mn$_{0.3}$Co$_{0.3}$O$_2$), a more significant decrease in the long-term cycle characteristics is yielded. However, it was surprisingly found in the present invention that a decrease in cycle characteristics is suppressed even for composite oxide having heterogeneous metal composition such as LiNi$_{0.5}$Mn$_{0.3}$Co$_{0.2}$O$_2$, if a composite oxide in which the true density/tap density is within a specific range and, the average porosity on the center side of the half (R/2 [μm]) of the particle radius (R) of D50 of the secondary particles is larger than the average porosity on the surface side in the secondary particles of the composite oxide is used, and thus the stress deformation applied on the inside of the particles during expansion and shrinking can be alleviated.

Thus, the positive electrode active substance of a composite oxide in which b, c, and d of General Formula (1) satisfy 0.44≤b≤0.51, 0.27≤c≤0.31, and 0.19≤d≤0.26 is preferable in that the effect of the present invention is obtained at significant level.

The lithium nickel-based composite oxide (including NMC composite oxide) of the present invention can be produced by selecting various known methods such as co-precipitation and spray drying. From the viewpoint of having easy production of the composite oxide according to the present invention, co-precipitation is preferably used. Specifically, lithium nickel-based composite hydroxide (for example, nickel-cobalt-manganese composite hydroxide) is produced by co-precipitation such as the method described in JP 2011-105588 A. After that, the lithium nickel-based composite hydroxide (for example, nickel-cobalt-manganese composite hydroxide) is admixed with a lithium compound followed by calcination, and it is obtained accordingly.

Specific descriptions are given hereinbelow.

A raw material compound of composite oxide, for example, a Ni compound, a Mn compound and a Co compound, is dissolved in a suitable solvent such as water so as to have desired composition of an active substance material. Examples of a Ni compound, a Mn compound and a Co compound include sulfate, nitrate, carbonate, acetate, oxalate, oxide, hydroxide, and halide of the metal element. Specific examples of a Ni compound, a Mn compound and a Co compound include nickel sulfate, cobalt sulfate, manganese sulfate, nickel acetate, cobalt acetate, and manganese acetate, but not limited thereto. During the process, if necessary or to have desired composition of an active substance, a compound containing at least one metal element such as Ti, Zr, Nb, W, P, Al, Mg, V, Ca, Sr and Cr can be further incorporated as a metal element for replacing the part of the layered lithium metal composite oxide which forms the active substance.

The co-precipitation reaction can be performed by neutralization and precipitation using the above raw material compound and an alkali solution. Accordingly, metal composite hydroxide or metal composite carbonate containing the metal included in the above raw material compound can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for a neutralization is sufficient to have an equivalent ratio of 1.0 relative to the part for neutralization in entire metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation is then preferably filtered by suction, washed, and dried.

Subsequently, by mixing and calcining the lithium nickel-based composite hydroxide (for example, nickel-cobalt-manganese composite hydroxide) with a lithium compound, a lithium nickel-based composite oxide (for example, nickel-cobalt-manganese composite oxide) can be obtained. Examples of the Li compound include lithium hydroxide or a hydrate thereof, lithium peroxide, lithium nitrate and lithium carbonate.

The calcination is preferably performed by two steps (temporary calcination and main calcination). According to two-step calcination, composite oxide can be obtained efficiently. The conditions for temporary calcination are not particularly limited, but the temperature increase rate is 1 to 20° C./minute from room temperature. Furthermore, the atmosphere is preferably air or oxygen atmosphere. Furthermore, the temperature for calcination is preferably 700 to 1000° C., and more preferably 650 to 750° C. Furthermore, the time for calcination is preferably 3 to 20 hours and more preferably 4 to 6 hours. Meanwhile, the conditions for main calcination are not particularly limited, but the temperature increase rate is 1 to 20° C./minute from room temperature. Furthermore, the atmosphere is preferably air or oxygen atmosphere. Furthermore, the temperature for calcination is preferably 700 to 1000° C., and more preferably 850 to 1100° C. Furthermore, the time for calcination is preferably 3 to 20 hours and more preferably 8 to 12 hours.

To add a tiny amount of a metal element for replacing part of the layered lithium metal composite oxide constituting an active substance material as needed, any means such as the methods (1) to (3) below can be used. (1) A method in which mixing in advance with nickel acid salt, and if necessary, also with cobalt acid salt or manganese acid salt is performed. (2) A method in which adding simultaneously with nickel acid salt, and if necessary, also with cobalt acid salt or manganese acid salt is performed. (3) A method in which adding to a reaction solution during the reaction, or adding to a lithium metal composite oxide (for example, nickel-cobalt-manganese composite oxide) with a Li compound is performed.

The composite oxide of the present invention can be produced by suitably controlling the reaction conditions such as the pH of a reaction solution, reaction temperature, reaction concentration, addition rate, power for stirring, and speed for stirring.

With regard to the lithium nickel-based composite oxide of the present invention, for producing a composite oxide in which the true density/tap density is within the aforementioned specific range, and in the secondary particles of the composite oxide, the average porosity on the center side of the half (R/2 [μm]) of the particle radius (R) of D50 of the secondary particles is larger than the average porosity on the surface side, the true density/tap density can be freely controlled by adjusting first the calcination time. In order to have the true density/tap density within the aforementioned specific range, the calcination time is preferably set at 8 hours to 10 hours, and more preferably at 8 hours or so.

Meanwhile, in addition to this condition, the true density/tap density can be controlled by adjusting the conditions such as calcination temperature and a precursor.

Next, by suitably adjusting the calcination time, the porosity in the secondary particles (in particular, center part) can be freely controlled. In the secondary particles, in order to have the average porosity on the center side of the half (R/2 [μm]) of the particle radius (R) of D50 of the secondary particles that is larger than the average porosity on the surface side, the calcination time is preferably set at 8 hours to 10 hours, and more preferably at 8 hours or so. Meanwhile, in addition to this condition, the porosity in the secondary particles (in particular, center part) can be controlled by adjusting the conditions such as calcination temperature and a precursor.

Furthermore, by suitably setting the calcination temperature, the average particle diameter of the primary particles (D1) can be freely controlled. To have the average particle diameter of the primary particles (D1) within the aforementioned specific range, the calcination temperature is preferably 730° C. to 850° C., and more preferably 760° C. to 820° C. Meanwhile, in addition to this condition, the average particle diameter of the primary particles (D1) can be controlled by adjusting the conditions such as calcination time and a precursor.

The second embodiment of the present invention relates to a positive electrode material which contains the positive electrode active substance of the first embodiment. By using this positive electrode material, a secondary battery exhibiting the aforementioned working effects can be provided. Preferably, it is a positive electrode material containing the positive electrode active substance of the first embodiment and a spinel type manganese positive electrode active substance. Inventors of the present invention found that the lithium nickel-based composite oxide as the positive electrode active substance of the first embodiment, in particular, an NMC composite oxide, has a problem that it has a high voltage lowering during high output discharge at low temperature, for example, insufficient output of an automobile in a cold region. In this connection, it was found that, voltage lowering during high output discharge at low temperature is reduced and also insufficient output of an automobile in a cold region is improved by mixing it with spinel type manganese positive electrode active substance.

The mixing weight ratio of the positive electrode active substance according to the aforementioned first embodiment to spinel type manganese positive electrode active substance is preferably as follows: positive electrode active substance according to the first embodiment: spinel type manganese positive electrode active substance=50:50 to 90:10, from the viewpoint of the cycle characteristics. From the viewpoint of the balance in capacity, service life, and heat stability, it is more preferably 70:30 to 90:10.

According to another aspect of the present invention, a positive electrode in which a layer of a positive electrode active substance containing at least one selected from the group consisting of the positive electrode active substance according to the first embodiment and the positive electrode material according to the second embodiment is formed on a surface of a positive electrode current collector is provided. By using this positive electrode, it becomes possible to provide a secondary battery which exhibits the working effects described above.

Meanwhile, it is needless to say that the positive electrode can contain other positive electrode active substance which plays a role of an active substance. At least one selected from the group consisting of the positive electrode active substance according to the first embodiment and the positive electrode material according to the second embodiment is preferably 80 to 100% by weight, more preferably 95 to 100% by weight, and even more preferably 100% by weight relative to 100% by weight of the positive electrode active substance.

If necessary, the positive electrode active substance layer further contains other additives such as a conductive aid, a binder, an electrolyte (for example, polymer matrix, ion conductive polymer, and electrolyte solution), and lithium salt for enhancing ion conductivity.

The content of the positive electrode active substance is preferably 85 to 99.5% by weight in the positive electrode active substance layer.

(Binder)

A binder used for the positive electrode active substance layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the positive electrode active substance layer is not particularly limited as long as the binder can bind the active substance. The amount of binder is preferably 0.5 to 15% by weight, more preferably 1 to 10% by weight with respect to the active substance layer.

If necessary, the positive electrode active substance layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active substance layer or negative electrode active substance layer. Examples of the conductive aid include carbon materials such as carbon black including ketjen black and acetylene black; graphite; and carbon fiber. When the active substance layer contains a conductive aid, an electron network in the inside of the active substance layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

The blending ratio of the components that are included in the positive electrode active substance layer and the negative electrode active substance layer described below is not particularly limited. The blending ratio can be suitably controlled in view of already-known knowledge regarding a lithium ion secondary battery. Preferably, the weight per unit area of the positive electrode active substance layer is in the range of 20 to 30 $mg/cm^2$ and the density of the layer is in the range of 2.5 $g/cm^3$ to 3.5 $g/cm^3$. Depending on the designed value of the weight per unit area of the positive electrode active substance layer, the performance balance between the charge and discharge capacity and output characteristics can be maintained at an optimum level (they can be obtained simultaneously) by having the weight per unit area within the aforementioned range, even if the charge and discharge capacity and output characteristics are generally in a trade-off relationship. In addition, although it is possible to increase the charge and discharge capacity per unit volume by increasing the density of a positive electrode active substance layer, excessive compression can be a reason for collapse of an active substance, and thus it is preferable to have the density within the aforementioned range. Having the density within the aforementioned range is favorable in that the charge and discharge capacity can be increased without having a capacity decrease which is caused by collapse of an active substance.

The thickness of the positive electrode active substance layer and the negative electrode active substance layer described below is not particularly limited either, and reference can be made to the already-known knowledge about a battery. For example, the thickness of any of the positive electrode active substance layer and the negative electrode active substance layer described below is 2 to 100 μm or so.

According to still another aspect of the present invention, a non-aqueous electrolyte secondary battery having a power generating element including the aforementioned positive electrode, a negative electrode in which a negative electrode active substance layer is formed on a surface of a negative electrode current collector, and a separator is provided. By having this constitution, a non-aqueous electrolyte secondary battery exhibiting the aforementioned working effects can be provided.

Next, a description is made of a non-aqueous electrolyte lithium ion secondary battery as a preferred embodiment of the non-aqueous electrolyte secondary battery, but it is not limited thereto. Meanwhile, same elements are given with the same symbols for the descriptions of the drawings, and overlapped descriptions are omitted. Further, note that dimensional ratios in the drawings are exaggerated for the sake of description, and are different from actual ratios in some cases.

FIG. 1 is a cross-sectional view schematically illustrating the basic constitution of a flat type (stack type) non-aqueous electrolyte lithium ion secondary battery which is not a bipolar type (hereinbelow, it is also simply referred to as a "stack type battery"). As illustrated in FIG. 1, a stack type battery 10 according to this embodiment has a structure in which a power generating element 21 with a substantially rectangular shape, in which a charge and discharge reaction actually occurs, is sealed inside of a battery outer casing material 29 as an outer casing body. Herein, the power generating element 21 has a constitution in which a positive electrode, the separator 17, and a negative electrode are stacked. Meanwhile, the separator 17 has a non-aqueous electrolyte (for example, liquid electrolyte) within it. The positive electrode has a structure in which the positive electrode active substance layer 15 is disposed on both surfaces of the positive electrode current collector 12. The negative electrode has a structure in which the negative electrode active substance layer 13 is disposed on both surfaces of the negative electrode current collector 11. Specifically, one positive electrode active substance layer 15 and the neighboring negative electrode active substance layer 13 are disposed to face each other via the separator 17, and a negative electrode, an electrolyte layer and a positive electrode are stacked in this order. Accordingly, the neighboring positive electrode, electrolyte layer and negative electrode form one single battery layer 19. As such, it can also be said that, as plural single battery layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the negative electrode active substance layer 13 is disposed only on a single surface. However, an active substance layer may be formed on both surfaces. Namely, not only a current collector exclusive for an outermost layer in which an active substance layer is formed on a single surface can be obtained but also a current collector having an active substance layer on both surfaces can be directly used as a current collector of an outermost layer. Furthermore, by reversing the arrangement of the positive electrode and negative electrode of FIG. 1, it is also possible that the outermost layer positive electrode current collector is disposed on both outermost layers of the power generating element 21 and a positive electrode active substance layer is disposed on a single surface or both surfaces of the same outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to a terminal of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding or resistance welding.

Meanwhile, although a flat type (stack type), stack type battery is illustrated in FIG. 1 instead of a bipolar type, it can also be a bipolar type battery containing a bipolar type electrode which has a positive electrode active substance layer electrically bound to one surface of a current collector and a negative electrode active substance layer electrically bound to the opposite surface of a current collector. In that case, one current collector plays both roles of a positive electrode current collector and a negative electrode current collector.

Hereinbelow, each member is described in greater detail.

[Negative Electrode Active Substance Layer]

The negative electrode active substance layer contains an active substance, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active substance layer.

The negative electrode active substance layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, a copolymer of (meth)acrylamide and/or (meth)acrylic acid salt [(meth)acrylamide polymer, (meth)acrylamide-(meth) acrylic acid salt copolymer, alkyl (meth) acrylic acid (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder selected from a group consisting of styrene-butadiene rubber, acrylonitrile-butadiene rubber, methacrylic acid methylbutadiene rubber, and methacrylic acid methyl rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 1:0.5 to 2.

In a binder used for the negative electrode active substance layer, the content of the aqueous binder is preferably 80 to 100% by weight, preferably 90 to 100% by weight, and preferably 100% by weight.

Examples of the negative electrode active substance include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active substance may be used in combination. Preferably, from the viewpoint of capacity and output characteristics, a carbon material or a lithium-transition metal composite oxide is used as a negative electrode active substance. Meanwhile, it is needless to say that a negative electrode active substance other than those described above can also be used.

The average particle diameter of a negative electrode active substance is, although not particularly limited, preferably 1 to 100 μm, and more preferably 1 to 20 μm from the viewpoint of having high output.

[Separator (Electrolyte Layer)]

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), a fuel cell vehicle (FCV) or the like, it is preferably 4 to 60 µm as a monolayer or a multilayer. Fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte. Furthermore, it is sufficient that the thickness of the non-woven separator is the same as that of an electrolyte layer. Preferably, it is 5 to 200 µm. Particularly preferably, it is 10 to 100 µm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active substance layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 g/m². When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 gf/cm$^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Current Collector]

The material for constituting a current collector is not particularly limited, but a metal is preferably used.

Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can also be a foil obtained by coating aluminum on a metal surface. Among them, from the viewpoint of electron conductivity or potential for operating a battery, aluminum, stainless, and copper are preferable.

The size of the current collector is determined based on the use of a battery. When it is used for a large-size battery which requires high energy density, for example, a current collector with large area is used. Thickness of the current collector is not particularly limited, either. Thickness of the current collector is generally 1 to 100 μm or so.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, an aluminate laminate is more preferred for an outer casing body.

[Cell Size]

Figure 2:
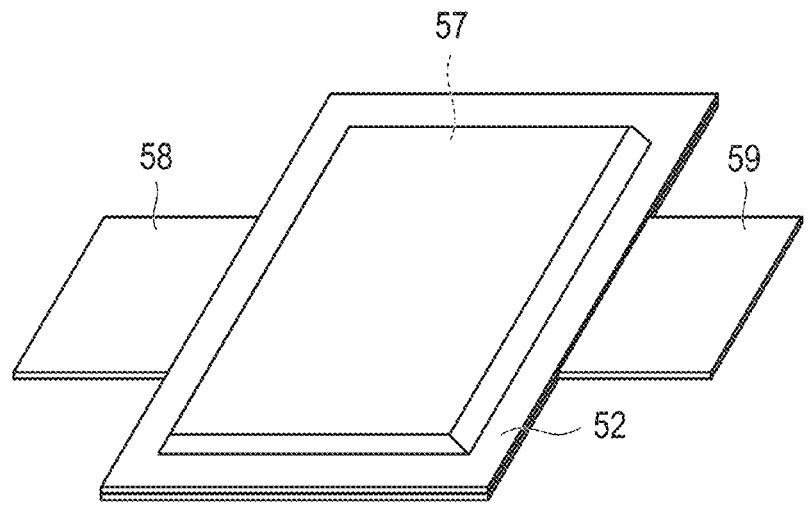
FIG. 2 is a perspective view illustrating outer appearance of a flat lithium ion secondary battery as a representative embodiment of a secondary battery.

FIG. 2 is a perspective view illustrating outer appearance of a flat lithium ion secondary battery as a representative embodiment of a secondary battery.

As illustrated in FIG. 2, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 1 as described above. In the power generating element 57, plural single battery layers (single cell) 19, which are each formed of the positive electrode (positive electrode active substance layer) 15, the electrolyte layer 17 and the negative electrode (negative electrode active substance layer) 13, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 2 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 2. Furthermore, in a winding type lithium ion battery, it is also possible to form a terminal by using, for example, a barrel can (metal can) instead of a tab.

In recent years, a battery with large size is required for an application in an automobile or the like. Furthermore, the effect of the present invention, that is, improving the cycle characteristics by suppressing a structure deformation caused by expansion and shrinking, which is resulting from charge and discharge cycle, is more efficiently exhibited in a battery with large size. Thus, in the present invention, it is preferable that the battery structure of which power generating element be covered with an outer casing have a large size, from the viewpoint of better exhibition of the effect of the present invention. Specifically, the negative electrode active substance layer preferably has a rectangular shape and the length of the short side of the rectangular shape is preferably 100 mm or more. Such large-size battery can be used for an automobile. Herein, the length of the short side of a negative electrode active substance layer indicates the length of the shortest side in each electrode. The upper limit of a length of a short side of a battery structure is, although not particularly limited, generally 250 mm or less.

It is also possible to define the large size of a battery in view of a relationship between battery area or battery capacity, from the viewpoint of a large-size battery which is different from the viewpoint of the physical size of an electrode. For example, in the case of a flat and stack type laminate battery, the ratio value of a battery area (projected area of a battery including a battery outer casing body) to rated capacity is 5 $cm^2$/Ah or more, and the rated capacity is 3 Ah or more. For a battery satisfying those requirements, the battery area per unit capacity is large so that a problem of having lowered battery characteristics (cycle characteristics), which is caused by deformation of active substance particles based on expansion and shrinking resulting from charge and discharge cycle may occur more easily. As such, the non-aqueous electrolyte secondary battery according to this embodiment is preferably a large-size battery as described above from the viewpoint of having a higher merit obtained from exhibition of the working effects of the present invention. The rated capacity of a battery can be obtained according to the measurement method described in Examples.

It is also possible that the large size of a battery is defined by a volume energy density or a single cell rated capacity. For example, according to the market requirement, a typical electric vehicle needs to have driving distance (cruising distance) of 100 km per single charge. Considering such cruising distance, the single cell rated capacity is preferably 20 Wh or more and the volume energy density of a battery is preferably 153 Wh/L or more. Meanwhile, the volume energy density and rated capacity are measured by the method described in the following Examples. Furthermore, the aspect ratio of a rectangular electrode is preferably 1 to 3, and more preferably 1 to 2. Meanwhile, the aspect ratio of an electrode is defined by longitudinal/transversal ratio of a positive electrode active substance layer with rectangular shape. By having the aspect ratio in this range, gas generated during charging can be evenly released in the plane direction, and thus desirable. As a result, the cycle characteristics (discharge capacity retention rate) can be improved in the case of use for a long period of time.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell vehicle, or a hybrid fuel cell vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

The present invention is described in more detail in view of the following Examples and Comparative Examples. However, it is evident that the technical scope of the present invention is not limited to the Examples described below.

Example 1

(1) Production of Positive Electrode Active Substance

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. The temperature was increased at a temperature increase rate of 5° C./min and calcination was performed under oxygen atmosphere at 760° C. for hours. After cooling to room temperature, positive electrode active substance A consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 360 nm. The average particle diameter of secondary particles (D2) was 5.8 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The measurement of D1, D2 and porosity in the secondary particles was performed as follows: FIB (Focused Ion Beam) was used, a cross-section of the obtained lithium nickel-based composite oxide was cut, and the cross-sectional image was taken by using a scanning type ion microscope (SIM). Meanwhile, as for the D1, at least 200 primary particles were selected and an average value of the diameter in the long axis direction thereof was calculated. As for the D2, at least 50 secondary particles were selected and an average value of the diameter in the long axis direction thereof was calculated. As for the average porosity in the secondary particles, at least 50 secondary particles were selected, and the average porosity was obtained from the center side and also the surface side of the half (R/2 [μm]) of the particle radius (R) of D50 of each secondary particle. Specifically, after having a black and white contrast resulting from scanning based on the cross-sectional image analysis, it was converted to dots or pixels, and the porosity was calculated from the ratio of dots or pixels in white area which corresponds to pores. As for the porosity on the center side and surface side, an average value of the porosity on the center side and surface side was obtained for each secondary particle, and each of the average porosity on the surface side and the average porosity on the surface side was calculated.

Furthermore, the true density and tap density of the secondary particles of the lithium nickel-based composite oxide as a positive electrode active substance were measured according to the methods that are described below.

(True Density)
Measurement Method Liquid Phase Replacement Method (Pycnometer Method)
Apparatus for measurement Auto True Denser MAT-7000 manufactured by SEISHIN ENTERPRISE Co., Ltd. (values were measured at measurement temperature of 25±5° C. by using ethanol as a replacement medium)

(Tap Density)
Sample powder (positive electrode active substance) was added to a 10 mL glass graduated cylinder. After tapping 200 times, the powder packing density was measured.

The composition, true density/tap density, and values of D1 and D2 of the lithium nickel-based composite oxide which has been obtained from above as positive electrode active substance A are shown in Table 1.

(2) Production of Positive Electrode

93% by weight of the positive electrode active substance (positive electrode material) obtained from (1), 4% by weight of carbon black as a conductive aid (average particle diameter: 300 nm), and 3% by weight of polyvinylidene fluoride (PVDF) as a binder were prepared. The positive electrode active substance, conductive aid, binder, and a suitable amount of N-methyl-2-pyrrolidone (NMP) as a solvent for controlling slurry viscosity were admixed with one another to prepare a slurry of positive electrode active substance. Then, the obtained slurry of positive electrode active substance was coated on an aluminum foil (length: 200 mm, width: 120 mm, and thickness: 20 μm) as a positive electrode current collector and dried. Thereafter, it was subjected to a press treatment to give a positive electrode which has a positive electrode active substance layer (length: 200 mm, width: 120 mm, and thickness: 80 μm) on both surfaces of the positive electrode current collector. The weight per unit area of the positive electrode active substance was 24 mg/cm$^2$ and the density was 3 g/cm$^3$. The aspect ratio of an electrode that is defined by longitudinal/transversal ratio of the positive electrode active substance layer with rectangular shape was 1.67.

(3) Preparation of Electrolyte Solution

A solution containing 1.0 M $LiPF_6$ dissolved in a mixed solvent of ethylene carbonate (EC) and dimethyl carbonate (DMC) (volume ratio of 1:1) was prepared. Then, vinylene carbonate was added in an amount which corresponds to 2% by weight relative to the weight of the electrolyte solution to yield an electrolyte solution. Meanwhile, the expression "1.0 M $LiPF_6$" means that the concentration of lithium salt ($LiPF_6$) in the mixture of the mixed solvent and lithium salt is 1.0 M.

(4) Production of Negative Electrode

A carbon negative electrode active substance in which amorphous carbon was coated on a surface of natural graphite was prepared as a negative electrode active substance, and a slurry was prepared by dispersing 96.5% by weight of this negative electrode active substance, 1.5% by weight of ammonium salt of carboxy methyl cellulose as a binder, and 2.0% by weight of styrene-butadiene copolymer latex in purified water.

The slurry was coated on a copper foil (length: 210 mm, width: 125 mm, thickness: 10 μm) as a negative electrode current collector, dried for 3 minutes at 120° C., and subjected to press molding using a roll press machine to give a negative electrode which has a negative electrode active substance layer (length: 210 mm, width: 125 mm, and thickness: 60 μm) on both surfaces of the negative electrode current collector. The weight per unit area of the negative electrode active substance was 9 mg/cm$^2$ and the density was 1.5 g/cm$^3$.

(5) Production of Laminate Cell

A laminate body (three layers of positive electrode and four layers of negative electrode) was produced by alternately laminating the positive electrode and the negative electrode having an element for current collection (current collecting plate) via a separator (polypropylene microporous film, length: 215 mm, width: 130 mm, thickness: 25 μm). It was then stored on a laminate film followed by injection of a predetermined amount of an electrolyte solution to give a laminate battery with the length of 260 mm×width of 150 mm×thickness of 7 mm. The rated capacity of the obtained battery was 3.3 Ah. The area of the battery outer casing body was 390 cm². The ratio of the battery area (projected area of a battery including a battery outer casing body) to rated capacity was 118 cm²/Ah.

The rated capacity of a battery was obtained as described below.

<<Measurement of Rated Capacity>>

For measurement of rated capacity, a battery for test was injected with an electrolyte solution, allowed to stand for 10 hours or so, and subjected to initial charge. After that, the measurement was carried out according to the following Steps 1 to 5 at temperature of 25° C., in the voltage range of 3.0 V to 4.15 V.

Step 1: After charging at constant current of 0.2 C to reach 4.15 V, it was rested for 5 minutes.

Step 2: After Step 1, it was charged for 1.5 hours by constant voltage charge followed by resting for 5 minutes.

Step 3: After constant current discharge at 0.2 C to reach 3.0 V, it was discharged for 2 hours by constant voltage discharge followed by resting for 10 seconds.

Step 4: After constant current charge at 0.2 C to reach 4.1 V, it was charged for 2.5 hours by constant voltage charge followed by resting for 10 seconds.

Step 5: After constant current discharge at 0.2 C to reach 3.0 V, it was discharged for 2 hours by constant voltage discharge followed by resting for 10 seconds.

Rated capacity: The discharge capacity (CCCV discharge capacity) bridging from the constant current discharge to constant voltage discharge of Step 5 is used as rated capacity.

Example 2

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under oxygen atmosphere at 780° C. for 9 hours. After cooling to room temperature, positive electrode active substance B consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 250 nm. The average particle diameter of secondary particles (D2) was 8.6 Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance B were measured in the same manner as in the Example 1. A laminate battery was produced in the same manner as in the Example 1 except that the positive electrode active substance B having the compositional ratio, true density/tap density, porosity of the secondary particles, D1, and D2 shown in Table 1 was used.

Example 3

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under oxygen atmosphere at 760° C. for 8 hours. After cooling to room temperature, positive electrode active substance C consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 186 nm. The average particle diameter of secondary particles (D2) was 6.7 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance C were measured in the same manner as in the Example 1. A laminate battery was produced in the same manner as in the Example 1 except that the positive electrode active substance C having the compositional ratio, true density/tap density, porosity of the secondary particles, D1, and D2 shown in Table 1 was used.

Example 4

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under oxygen atmosphere at 820° C. for 8 hours. After cooling to room temperature, positive electrode active substance D consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 220 nm. The average particle diameter of secondary particles (D2) was 12.3 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance D were measured in the same manner as in the Example 1. A laminate battery was produced in the same manner as in the Example 1 except that the positive electrode active substance D having the compositional ratio, true density/tap density, porosity of the secondary particles, D1, and D2 shown in Table 1 was used.

Example 5

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under oxygen atmosphere at 800° C. for 10 hours. After cooling to room temperature, positive electrode active substance E consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 310 nm. The average particle diameter of secondary particles (D2) was 7.9 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance E were measured in the same manner as in the Example 1. A laminate battery was produced in the same manner as in the Example 1 except that the positive electrode active substance E having the compositional ratio, true density/tap density, porosity of the secondary particles, D1, and D2 shown in Table 1 was used.

Comparative Example 1

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under air atmosphere at 900° C. for 10 hours. After cooling to room temperature, positive electrode active substance F consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 667 nm. The average particle diameter of secondary particles (D2) was 8.0 μm. Furthermore, the average porosity on the center side of the half (R/2 [μm]) of the particle radius (R) of D50 of the secondary particles in the secondary particles of the obtained lithium nickel-based composite oxide was smaller than the average porosity on the surface side (see Table 1 for the details).

The true density/tap density, porosity of the secondary particles, D1, and D2 of the positive electrode active substance F were measured in the same manner as in the Example 1. A laminate battery was produced in the same manner as in the Example 1 except that the positive electrode active substance F having the compositional ratio, true density/tap density, porosity of the secondary particles, D1, and D2 shown in Table 1 was used.

Comparative Example 2

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under air atmosphere at 850° C. for 9 hours. After cooling to room temperature, positive electrode active substance G consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 485 nm. The average particle diameter of secondary particles (D2) was 5.9 Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance G were measured in the same manner as in the Example 1. A laminate battery was produced in the same manner as in the Example 1 except that the positive electrode active substance G having the compositional ratio, true density/tap density, porosity of the secondary particles, D1, and D2 shown in Table 1 was used.

Example 6

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under air atmosphere at 820° C. for 9 hours. After cooling to room temperature, positive electrode active substance H consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 410 nm. The average particle diameter of secondary particles (D2) was 5.7 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance H were measured in the same manner as in the Example 1. A laminate battery was produced in the same manner as in the Example 1 except that the positive electrode active substance H having the compositional ratio, true density/tap density, porosity of the secondary particles, D1, and D2 shown in Table 1 was used.

Example 7

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under air atmosphere at 810° C. for 9 hours. After cooling to room temperature, positive electrode active substance I consisting of a lithium nickel-based composite oxide (compositional formula: $LiNi_{0.8}Co_{0.1}Mn_{0.1}O_2$) was obtained. The average particle diameter of primary particles (D1) in the secondary particles of the obtained lithium nickel-based composite oxide was 212 nm. The average particle diameter of secondary particles (D2) was 13.2 μm. Furthermore, the average porosity on the center side of the half (R/2 [μm]) of the particle radius (R) of D50 of the secondary particles in the secondary particles of the obtained lithium nickel-based composite oxide was larger than the average porosity on the surface side (see Table 1 for the details).

The true density/tap density, porosity of the secondary particles, D1, and D2 of the positive electrode active substance I were measured in the same manner as in the Example 1. A laminate battery was produced in the same manner as in the Example 1 except that the positive electrode active substance I having the compositional ratio, true density/tap density, porosity of the secondary particles, D1, and D2 shown in Table 1 was used.

Comparative Example 3

To an aqueous solution (1.0 mol/L) having nickel sulfate, cobalt sulfate, and manganese sulfate dissolved therein, sodium hydroxide and ammonia were continuously supplied, and according to a co-precipitation method, metal composite hydroxide in which nickel, cobalt, and manganese were dissolved at molar ratio of 80:10:10 was produced.

The metal composite hydroxide and lithium carbonate were weighed such that the ratio of the total mole number of metals (Ni, Co, Mn) other than Li to the mole number of Li was 1:1, and then thoroughly mixed. It was then calcined under oxygen atmosphere at 750° C. for 7 hours. After cooling to room temperature, positive electrode active substance J consisting of a lithium nickel-based composite oxide (compositional formula: $LiNi_{0.8}CO_{0.1}Mn_{0.1}O_2$) was obtained. The average particle diameter of primary particles (D1) in the secondary particles of the obtained lithium nickel-based composite oxide was 202 nm. The average particle diameter of secondary particles (D2) was 8.4 μm. Furthermore, the average porosity on the center side of the half (R/2 [μm]) of the particle radius (R) of D50 of the secondary particles in the secondary particles of the obtained lithium nickel-based composite oxide was smaller than the average porosity on the surface side (see Table 1 for the details).

The true density/tap density, porosity of the secondary particles, D1, and D2 of the positive electrode active substance J were measured in the same manner as in the Example 1. A laminate battery was produced in the same manner as in the Example 1 except that the positive electrode active substance J having the compositional ratio, true density/tap density, porosity of the secondary particles, D1, and D2 shown in Table 1 was used.

[Method for Evaluation]

(1) Output Characteristics

After giving sufficient aging time to the laminate batteries produced in the Examples 1 to 7 and Comparative Examples 1 to 3 (after stabilization of open circuit voltage), the output characteristics were measured. The output characteristics were defined as 3 C discharge capacity/0.2 C discharge capacity. Specifically, charging was performed at 25° C. with a rate of 1 C up to 4.15 V. After that, discharging was performed with a rate of 3 C up to 2.5 V. Next, charging was performed with a rate of 1 C up to 4.15 V. After that, discharging was performed with a rate of 0.2 C up to 2.5 V. With regard to this charge and discharge test, the capacity at the time of discharge with a rate of 3 C (3 C discharge capacity) and the capacity at the time of discharge with a rate of 0.2 C (0.2 C discharge capacity) were obtained, and then 3 C discharge capacity/0.2 C discharge capacity was calculated as output characteristics.

Figure 3:
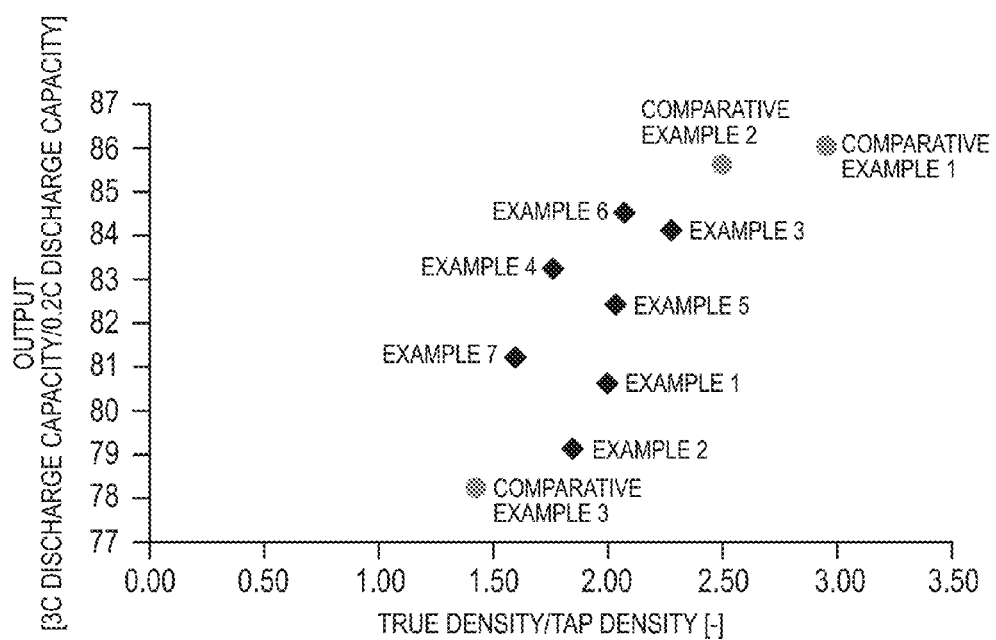
FIG. 3 is a drawing illustrating the relationship of the output characteristics (3 C discharge capacity/0.2 C discharge capacity) of the batteries compared to the true density/tap density of the positive electrode active substances which were used for the batteries produced in each Example and Comparative Example.

The results of the obtained output characteristics (3 C discharge capacity/0.2 C discharge capacity) are shown in Table 1. Furthermore, the relationship of the output characteristics (3 C discharge capacity/0.2 C discharge capacity) compared to the true density/tap density of the positive electrode active substances A to J, which have been used in each Example and Comparative Example, is illustrated in FIG. 3.

(2) Discharge Capacity Retention Rate (%)

After giving sufficient aging time to the laminate batteries produced in the Examples 1 to 7 and Comparative Examples 1 to 3 (after stabilization of open circuit voltage), charging was performed at 25° C. with a rate of 1 C up to 4.15 V. After that, discharging was performed with a rate of 1 C up to 2.5 V. By having this operation of charge and discharge as one cycle, 500 cycles of charge and discharge were performed with a rate of 1 C in the range of 2.5 to 4.15 V. The discharge capacity at initial stage (at $1^{st}$ cycle) and the discharge capacity at $500^{th}$ cycle were measured. Accordingly, discharge capacity retention rate (%) was calculated as follows and it was evaluated as cycle durability.

Discharge capacity retention rate (%)=(Discharge capacity at $500^{th}$ cycle/Discharge capacity at initial stage)×100

Figure 4:
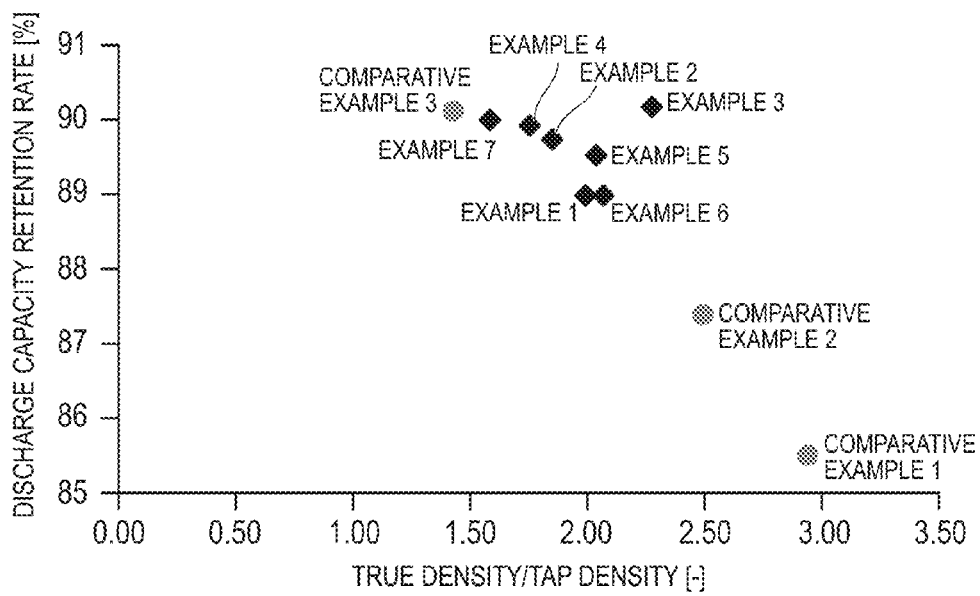
FIG. 4 is a drawing illustrating the relationship of the discharge capacity retention rate of the batteries compared to the true density/tap density of the positive electrode active substances which were used for the batteries produced in each Example and Comparative Example.
Figure 6:
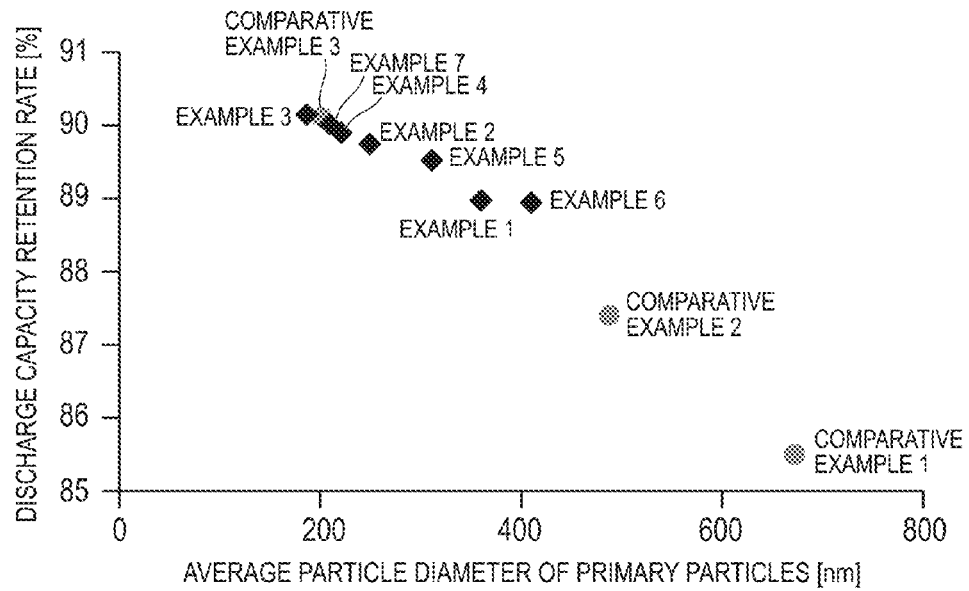
FIG. 6 is a drawing illustrating the relationship of the discharge capacity retention rate of the batteries compared to the average particle diameter of the primary particles within the positive electrode active substances (secondary particles) which were used for the batteries produced in each Example.

The obtained results of the discharge capacity retention rate (%) are shown in Table 1. Furthermore, the relationship of the discharge capacity retention rate compared to the true density/tap density of the positive electrode active substances A to J, which have been used in each Example and Comparative Example, is illustrated in FIG. 4. Furthermore, the relationship of the discharge capacity retention rate compared to the average particle diameter of primary particles of the positive electrode active substances A to J, which have been used in each Example and Comparative Example, is illustrated in FIG. 6.

(3) Battery Resistance Increase Rate (%)

After giving sufficient aging time to the laminate batteries produced in the Examples 1 to 7 and Comparative Examples 1 to 3 (after stabilization of open circuit voltage), charging and discharging was performed in the same manner as above (2) until 500$^{th}$ cycle. Based on the battery resistance at initial stage (1$^{st}$ cycle) and after the 500$^{th}$ cycle, the resistance increase rate was determined. Battery resistance was obtained from voltage lowering at the time of applying current of 1 C at 25° C. after adjusting the battery to SOC of 50%, which is performed separately from the cycle test after the 1$^{st}$ cycle and after the 500$^{th}$ cycle. Meanwhile, the charge and discharge cycle test up to the 500$^{th}$ cycle was performed for the 2$^{nd}$ cycle and the following cycles after the battery resistance had been measured after the 1$^{st}$ cycle. Based on the followings, the resistance increase (rise) rate was calculated, and it was evaluated as cycle durability.

Resistance increase rate (%)=(Amount of voltage lowering after 500$^{th}$ cycle/Amount of voltage lowering after 1$^{st}$ cycle)×100

Figure 5:
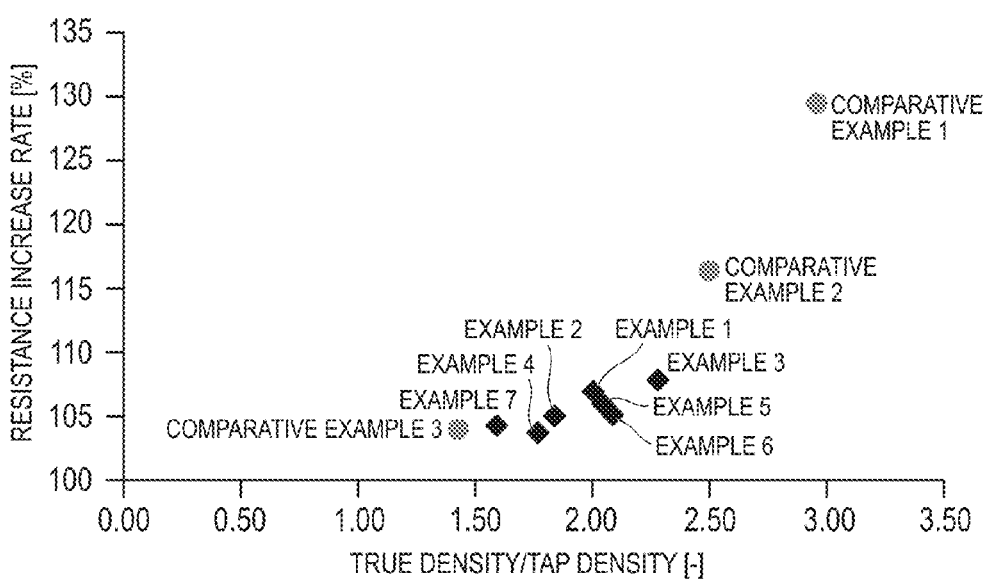
FIG. 5 is a drawing illustrating the relationship of the battery resistance increase rate of the batteries compared to the true density/tap density of the positive electrode active substances which were used for the batteries produced in each Example and Comparative Example.

The obtained results of the battery resistance increase rate (%) are shown in Table 1. Furthermore, the relationship of the battery resistance increase rate compared to the true density/tap density of the positive electrode active substances A to J, which have been used in each Example and Comparative Example, is illustrated in FIG. 5.

A laminate battery was produced in the same manner as in the Example 3 except that the slurry of the positive electrode active substance prepared from above was used instead of the slurry of the positive electrode active substance of the Example 3, the weight per unit area of the positive electrode active substance was 20 mg/cm$^2$, and density was 3 g/cm$^3$.

Example 9

A laminate battery was produced in the same manner as in the Example 3 except that the same slurry of the positive electrode active substance as that of the Example 8 was used, the weight per unit area of a positive electrode active substance was 24 mg/cm$^2$, and density was 3 g/cm$^3$.

Example 10

A laminate battery was produced in the same manner as in the Example 3 except that the same slurry of the positive electrode active substance as that of the Example 8 was used, the weight per unit area of a positive electrode active substance was 28 mg/cm$^2$, and density was 3 g/cm$^3$.

Example 11

A laminate battery was produced in the same manner as in the Example 3 except that the same slurry of the positive

TABLE 1

| | Positive electrode active substance | True density/tap density | Porosity within secondary particles (%) | | D1 (nm) | D2 (μm) | Compositional ratio of lithium nickel-based composite oxide | Output characteristics (3 C discharge capacity/0.2 C discharge capacity) | Discharge capacity retention rate (%) at 500$^{th}$ cycle | Battery resistance increase rate (%) at 500$^{th}$ cycle |
| | | | Surface side compared to R/2 | Center side compared to R/2 | | | | | | |
|---|---|---|---|---|---|---|---|---|---|---|
| Example 1 | A | 2.01 | 3.0% | 3.7% | 360 | 5.8 | LiNi$_{0.8}$Co$_{0.1}$Mn$_{0.1}$O$_2$ | 80.6 | 89.0 | 106.9 |
| Example 2 | B | 1.85 | 2.1% | 5.6% | 250 | 8.6 | LiNi$_{0.8}$Co$_{0.1}$Mn$_{0.1}$O$_2$ | 79.1 | 89.7 | 105.1 |
| Example 3 | C | 2.28 | 1.3% | 7.8% | 186 | 6.7 | LiNi$_{0.8}$Co$_{0.1}$Mn$_{0.1}$O$_2$ | 84.1 | 90.2 | 107.8 |
| Example 4 | D | 1.77 | 0.9% | 1.7% | 220 | 12.3 | LiNi$_{0.8}$Co$_{0.1}$Mn$_{0.1}$O$_2$ | 83.2 | 89.9 | 103.7 |
| Example 5 | E | 2.04 | 5.6% | 5.7% | 310 | 7.9 | LiNi$_{0.8}$Co$_{0.1}$Mn$_{0.1}$O$_2$ | 82.4 | 89.5 | 106.0 |
| Comparative Example 1 | F | 2.94 | 15.3% | 11.2% | 667 | 8.0 | LiNi$_{0.8}$Co$_{0.1}$Mn$_{0.1}$O$_2$ | 86.0 | 85.5 | 129.5 |
| Comparative Example 2 | G | 2.49 | 3.7% | 23.4% | 485 | 5.9 | LiNi$_{0.8}$Co$_{0.1}$Mn$_{0.1}$O$_2$ | 85.6 | 87.4 | 116.4 |
| Example 6 | H | 2.08 | 5.7% | 6.4% | 410 | 5.7 | LiNi$_{0.8}$Co$_{0.1}$Mn$_{0.1}$O$_2$ | 84.5 | 88.9 | 105.1 |
| Example 7 | I | 1.60 | 0.6% | 0.7% | 212 | 13.2 | LiNi$_{0.8}$Co$_{0.1}$Mn$_{0.1}$O$_2$ | 81.2 | 90.0 | 104.3 |
| Comparative Example 3 | J | 1.43 | 7.7% | 1.2% | 202 | 8.4 | LiNi$_{0.8}$Co$_{0.1}$Mn$_{0.1}$O$_2$ | 78.2 | 90.1 | 104.0 |

Example 8

Electrolytic manganese dioxide and aluminum hydroxide were admixed with each other and subjected to a heating treatment at 750° C. to yield manganese (III) dioxide. After that, lithium carbonate was added and mixed such that Li/(Mn+Al) molar ratio was 0.55 followed by calcination for 20 hours at 850° C. to obtain spinel lithium manganese acid.

A positive electrode material consisting of a mixture of the lithium nickel-based composite oxide (compositional formula: LiNi$_{0.8}$Co$_{0.1}$Mn$_{0.1}$O$_2$) which was prepared in Example 3 and the spinel lithium manganese acid prepared above (mixing weight ratio of lithium nickel-based composite oxide:spinel lithium manganese acid=3:1) was prepared. Slurry of the positive electrode active substance was prepared in the same manner as in the Example 3 by using the above positive electrode material.

electrode active substance as that of the Example 8 was used, the weight per unit area of a positive electrode active substance was 32 mg/cm$^2$, and density was 3 g/cm$^3$.

[Method for Evaluation]

(1) Output Characteristics

After giving sufficient aging time to the laminate batteries produced in the Examples 8 to 11 (after stabilization of open circuit voltage), the output characteristics were measured. The output characteristics were defined as 3 C discharge capacity/0.2 C discharge capacity. Specifically, charging was performed at 25° C. with a rate of 1 C up to 4.15 V. After that, discharging was performed with a rate of 3 C up to 2.5 V. Next, charging was performed with a rate of 1 C up to 4.15 V. After that, discharging was performed with a rate of 0.2 C up to 2.5 V. With regard to this charge and discharge test, the capacity at the time of discharge with a rate of 3 C (3 C discharge capacity) and the capacity at the time of discharge with a rate of 0.2 C (0.2 C discharge capacity) were obtained, and then 3 C discharge capacity/0.2 C discharge capacity was calculated as output characteristics.

Figure 7:
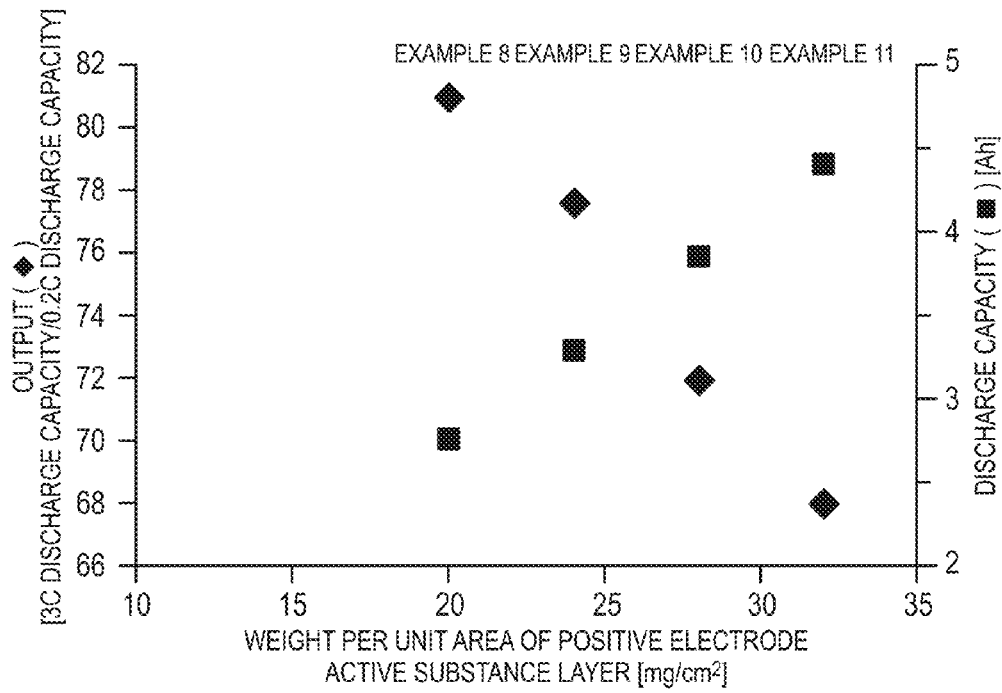
FIG. 7 is a drawing illustrating the relationship of the output characteristics and discharge capacity of the batteries compared to the weight per unit area of the positive electrode active substances which were used for the batteries produced in each Example.

The results of the obtained output characteristics (3 C discharge capacity/0.2 C discharge capacity) are shown in Table 2. Furthermore, the relationship of the output characteristics (3 C discharge capacity/0.2 C discharge capacity) compared to the weight per unit area of the positive electrode active substances of the Examples 8 to 11 is illustrated in FIG. 7.

(2) Discharge Capacity (Ah) and Discharge Capacity Retention Rate (%)

After giving sufficient aging time to the laminate batteries produced in the Examples 8 to 11 (after stabilization of open circuit voltage), charging was performed at 25° C. with a rate of 1 C up to 4.15 V. After that, discharging was performed with a rate of 1 C up to 2.5 V. By having this operation of charge and discharge as one cycle, 500 cycles of charge and discharge were performed with a rate of 1 C in the range of 2.5 to 4.15 V. The discharge capacity at initial stage (at $1^{st}$ cycle) and the discharge capacity at $500^{th}$ cycle were measured. Accordingly, discharge capacity retention rate (%) was calculated as follows and it was evaluated as cycle durability.

Discharge capacity retention rate (%)=(Discharge capacity at $500^{th}$ cycle/Discharge capacity at initial stage)×100

The obtained results of the discharge capacity (Ah) at $500^{th}$ cycle and discharge capacity retention rate (%) are shown in Table 2. Furthermore, the relationship of the discharge capacity at $500^{th}$ cycle compared to the weight per unit area of the positive electrode active substances of Examples 8 to 11 is illustrated in FIG. 7.

The present application is based on Japanese Patent Application No. 2013-054052 filed on Mar. 15, 2013, and its disclosure is entirely incorporated herein by reference.

REFERENCE SIGNS LIST 10, 50 Lithium ion secondary battery
11 Negative electrode current collector
12 Positive electrode current collector
13 Negative electrode active substance layer
15 Positive electrode active substance layer
17 Separator
19 Single battery layer
21, 57 Power generating element
25 Negative electrode current collecting plate
27 Positive electrode current collecting plate
29, 52 Battery outer casing material
58 Positive electrode current collecting plate (positive electrode tab)
59 Negative electrode current collecting plate (negative electrode tab)

The invention claimed is:

1. A positive electrode active substance for a non-aqueous electrolyte secondary battery, wherein the true density/tap density of secondary particles of a lithium composite oxide containing nickel as the main component is within the range of 1.6 to 2.3, and the average porosity on the center side of the half (R/2 [μm]) of the particle radius (R) of D50 of the secondary particles is larger than the average porosity on the surface side in the secondary particles.

2. The positive electrode active substance according to claim 1, wherein the average particle diameter of primary particles which constitute the secondary particles is 420 nm or less.

TABLE 2

| | Porosity within secondary particles (%) | | | | | | Mixing ratio of mixed active substances | Weight per unit area of positive electrode active substance layer (mg/cm²) | Density of positive electrode active substance layer (g/cm³) | Output characteristics (3 C discharge capacity/0.2 C discharge capacity) | Discharge capacity (Ah) | Discharge capacity retention rate (%) at 500$^{th}$ cycle |
|---|---|---|---|---|---|---|---|---|---|---|---|---|
| | True density/ tap density | Surface side compared to R/2 | Center side compared to R/2 | D1 (nm) | D2 (μm) | Compositional ratio | | | | | | |
| Example 8 | 2.28 | 1.3% | 7.8% | 186 | 6.7 | LiNi$_{0.8}$Co$_{0.1}$Mn$_{0.1}$O$_2$ | 3:1 | 20 | 3 | 81 | 2.75 | 91.1 |
| Example 9 | | | | | | | | 24 | 3 | 77.6 | 3.3 | 90.2 |
| Example 10 | | | | | | | | 28 | 3 | 72 | 3.85 | 88.1 |
| Example 11 | | | | | | | | 32 | 3 | 68 | 4.4 | 85.3 |

The value given in the column of "Mixing ratio of mixed active substances" in Table 2 indicates lithium nickel-based composite oxide:spinel lithium manganese acid (mixing weight ratio).

From the results described above, it was found that the batteries of the Examples 1 to 11 using the positive electrode active substance or positive electrode material of the present invention have better output characteristics and also better cycle durability (high discharge capacity retention rate and low battery resistance increase rate) compared to the battery of the Comparative Examples 1 to 3.

3. The positive electrode active substance according to claim 1, wherein the lithium composite oxide containing nickel as the main component is represented by General Formula: Li$_a$Ni$_b$Mn$_c$Co$_d$M$_x$O$_2$ (with the proviso that, in the formula, a, b, c, d, and x satisfy 0.9≤a≤1.2, 0<b<1, 0<c≤0.5, 0<d≤0.5, 0≤x≤0.3, and b+c+d=1. M represents at least one selected from the group consisting of Ti, Zr, Nb, W, P, Al, Mg, V, Ca, Sr, and Cr).

4. The positive electrode active substance according to claim 3, wherein b, c and d are as follows: 0.44≤b≤0.51, 0.27≤c≤0.31, and 0.19≤d≤0.26.

5. A positive electrode material for a non-aqueous electrolyte secondary battery, the positive electrode material comprising the positive electrode active substance according to claim 1.

6. The positive electrode material for a non-aqueous electrolyte secondary battery according to claim 5, the positive electrode material comprising the positive electrode active substance and a spinel type manganese positive electrode active substance.

7. The positive electrode material for a non-aqueous electrolyte secondary battery according to claim 6, wherein the mixing weight ratio of the positive electrode active substance to the spinel type manganese positive electrode active substance is as follows: the positive electrode active substance:spinel type manganese positive electrode active substance=50:50 to 90:10.

8. A positive electrode for a non-aqueous electrolyte secondary battery, wherein a positive electrode active substance layer containing at least one selected from the group consisting of the positive electrode active substance according to claim 1.

9. The positive electrode for a non-aqueous electrolyte secondary battery according to claim 8, wherein the weight per unit area of the positive electrode active substance layer is in the range of 20 to 30 mg/cm$^2$ and the density of the layer is in the range of 2.5 g/cm$^3$ to 3.5 g/cm$^3$.

10. A non-aqueous electrolyte secondary battery comprising a power generating element comprising the positive electrode according to claim 8, a negative electrode in which a negative electrode active substance layer is formed on a surface of a negative electrode current collector, and a separator.

11. The non-aqueous electrolyte secondary battery according to claim 10, wherein the ratio of a battery area (projected area of a battery including a battery outer casing body) to rated capacity is 5 cm$^2$/Ah or more and the rated capacity is 3 Ah or more.

12. The non-aqueous electrolyte secondary battery according to claim 10, wherein the aspect ratio of an electrode defined as a longitudinal/transversal ratio of a rectangular positive electrode active substance layer is 1 to 3.

13. The non-aqueous electrolyte secondary battery according to claim 10, wherein the separator is a separator comprising a heat resistant insulating layer.

* * * * *